United States Patent Office 3,198,746
Patented Aug. 3, 1965

3,198,746
QUATERNARY AMMONIUM ARYLSULFONATE SOLUTIONS
Manuel M. Baizer, St. Louis, Mo., assignor to Monsanto Company, a corporation of Delaware
No Drawing. Filed June 11, 1962, Ser. No. 201,242
16 Claims. (Cl. 252—363.5)

The present invention relates to solutions of organic materials in quaternary ammonium aromatic sulfonates and water.

An object of the invention is to prepare concentrated aqueous solutions of organic materials, particularly of sparingly soluble or hydrophobic organic compounds. It is a further object of the invention to provide solutions of various organic compounds which are suitable for conducting various reactions of such compounds. An additional object of the invention is to provide a method of dissolving sparingly soluble organic compounds in water.

For many purposes it is desirable to prepare concentrated aqueous solutions of organic compounds. Thus, such solutions of organic compounds are useful for conducting Canizzaro's reaction of aldehydes, various types of homogeneous polymerization procedures, and many acidic and caustic hydrolysis procedures. Such solutions are also useful as media for crystallization and purification procedures, for selective extraction and purification procedures, and for various other procedures for the isolation of organic compounds.

In the present invention, quaternary ammonium arylsulfonates are employed as solubilizing agents to obtain concentrated solutions of organic compounds useful for the foregoing purposes. The water-soluble hygroscopic quaternary ammonium arylsulfonates in general are suitable for forming concentrated aqueous solutions of sparingly soluble organic compounds. The quaternary ammonium cation in such compounds is represented as follows:

$$\overset{+}{N}R_n$$

where $n$ is an integer from 2 to 4 representing the number of R's required to provide four valence bonds for the nitrogen and the R's are organic radicals having from 1 to 3 valence bonds to the nitrogen, provided that at least one R has a single valence bond to the nitrogen, and the R's are selected from the group consisting of aryl radicals, alkyl radicals omega-hydroxy alkyl radicals, divalent organic radicals forming a heterocyclic ring with the nitrogen atom, and trivalent organic radicals forming a heterocyclic ring with the nitrogen atom. In general the quaternary ammonium ion should have substituents of sufficient size to provide a fairly strong hydrophobic group, but not so large as to greatly impair the solubility of the salt. It is preferred that the quaternary ammonium ion have more than 6 but not more than 20 carbon atoms, usually no more than 15 carbon atoms and no more than 6 carbon atoms in a single radical. The arylsulfonate, including alkarylsulfonate, portion of the salt can be, for example, salts of the following acids: benzenesulfonic acid, o-, m-, or p-toluenesulfonic acid, o-, m- or p-ethylbenzenesulfonic acid, o-, m- or p-cumenesulfonic acid, o-, m- or p-tert-amylbenzenesulfonic acid, o-, m- or p-hexylbenzenesulfonic acid, o-xylene-4-sulfonic acid, o-xylene-2-sulfonic acid, m-xylene-4 or 5-sulfonic acid, mesitylene-2-sulfonic acid, durene-3-sulfonic acid, pentamethylbenzenesulfonic acid, o-dipropyl-benzene-4-sulfonic acid, alpha- or beta-naphthalenesulfonic acid, o-, m- or p-biphenylsulfonic acid, and alpha-methyl-beta-naphthalenesulfonic acid.

Quaternary ammonium sulfonates suitable for use in the present invention include, for example, tetraethylammonium o-, or m-toluenesulfonate or benzenesulfonate; tetraethylammonium o-, m- or p-cumenesulfonate or o-, m- or p-ethylbenzenesulfonate, tetramethylammonium benzenesulfonate or o-, m- or p-toluenesulfonate; N,N-dimethylpiperidinium o-, m- or p-toluenesulfonate or o-, m- or p-biphenylsulfonate; tetrabutylammonium alpha- or beta-naphthalenesulfonate or o-, m- or p-toluenesulfonate; tetrapropylammonium o-, m- or p-amylbenzenesulfonate or alpha-ethyl-beta-naphthalenesulfonate; tetraethanolammonium o-, m- or p-cumenesulfonate or o-, m- or p-toluenesulfonate; tetrabutanolammonium benzenesulfonate or p-xylene-3-sulfonate; tetrapentylammonium o-, m- or p-toluene-sulfonate or o-, m- or p-hexylbenzenesulfonate, tetrapentanolammonium p-cymene-3-sulfonate or benzenesulfonate; methyltriethylammonium o-, m- or p-toluenesulfonate or mesitylene-2-sulfonate; trimethylethylammonium o-xylene-4-sulfonate or o-, m- or p-toluenesulfonate; triethylpentylammonium alpha- or beta-naphthalenesulfonate or o-, m- or p-butylbenzenesulfonate, trimethylethanolammonium benzenesulfonate or o-, m- or p-toluenesulfonate; N,N-diethylpiperidinium or N-methylpyrrolidinium o-, m- or p-hexylbenzenesulfonate or o-, m- or p-toluenesulfonate, N,N-di-isopropyl or N,N-di-butylmorpholinium, o-, m- or p-toluenesulfonate or o-, m- or p-biphenylsulfonate, etc.

In general it is preferred that the ammonium cation be completely hydrocarbon except for the ammonium nitrogen, although the hydroxy alkyl substituents are also very useful in the ammonium cations. The tetraalkylammonium cations are in general very suitable and convenient for use, especially the ethyl, n-propyl, isopropyl and various isomeric butyl radicals; the pentyl, hexyl, heptyl and octyl radicals can also be employed, provided they are selected so that the total number of carbon atoms in the cation does not become too large. The tetraethylammonium cation is superior in its solubilizing power compared to the tetramethylammonium cation.

The present invention concerns as new compositions, concentrated aqueous solutions of organic compounds in which the specified quaternary ammonium arylsulfonates are employed as solubilizing agents. The invention is particularly concerned with such solutions of hydrocarbon or hydrocarbon type materials involving only one oxygen containing functional group or other functional groups present in rather minor proportions. Such solutions of olefins, are of especial interest, particularly of olefins having the olefinic bond in alpha-beta position to a carbonyl group or a nitrile group, for example, such olefins as alpha,beta unsaturated esters, amides, ketones, aldehydes. nitriles or conjugated diolefins, which have demonstrated or potential utility for use in conducting hydrodimerizations by electrolytic procedures, by such procedures as are described in my copending applications Serial Nos. 145,-482 and 145,480 filed October 16, 1961, and S.N. 75,130 filed December 12, 1960. All three of said copending applications are now abandoned. Such solutions are also useful for conducting electrolytic polymerizations and various other polymerizations which are suitably effected in aqueous solution.

Most of such olefinic compounds useful in hydrodimerizations will be completely hydrocarbon in composition except for the specified functional groups on a carbon atom of the olefinic bond and can therefore be viewed as substituted alkenes, i.e., as alpha carbamyl, cyano-, carbonyl, or carboxy-alkenes and will in general have no more than 20 or so carbon atoms. There are also included within the scope of the present invention solutions of various other organic compounds which will be useful for various other purposes described herein, for example alkanes, alkenes, arenes, including various benzene and substituted benzenes, and other aromatic compounds in general, organic acids, amines, higher alcohols, particularly alcohols of sufficient molecular weight to have very little water solubility, and various other organic compounds, especially those which are soluble in an amount less than 10% by weight in water, but which are rendered soluble in an amount at least 10% by weight in a water and quaternary ammonium sulfonate solution, preferably at least 15 or 20% by weight of such solution. It is not practical to name all of the specific organic compounds which can be dissolved and form solutions according to the procedure of the present invention, but the following are set forth as illustrative: acetyl acetone, amyl alcohol, bromonitrobenzene, o, m, p-cresols, cyclohexanol, nitrobenzene, phenylethylalcohol, furfural, and heptyl alcohol; generally of lesser solubility but still forming useful solutions with quaternary ammonium arylsulfonates according to the present invention are benzaldehyde, amylphenol, triethyl ketone, ethyl acetate and also methylene dichloride. Of course in any case where there is a question as to whether the particular organic compound is soluble in the solutions according to the present invention in the degree required for the particular application in view, the solubility can be readily determined by a simple solubility test.

The following examples are illustrative of the present invention. Some of the examples illustrate only the solutions and their preparation while others also demonstrate the utility of such solutions in electrolytic hydrodimerization procedures.

*Example 1*

Tetraethylammonium p-toluenesulfonate was prepared as follows: A mixture consisting of 200 g. (1 mole) of ethyl p-toluenesulfonate, 101 g. (1 mole) of triethylamine and 100 ml. of absolute alcohol was stirred at room temperature for 3.5 hours and then heated to 72° C. within 40 minutes. At this point an exothermic reaction occurred, and extraneous heating was discontinued and the mixture allowed to stand for 30 minutes. At the end of that time it was heated to reflux, and refluxing was continued for 6 hours. After being allowed to cool to room temperature, the solvents and any unreacted material was stripped off with an aspirator to obtain a residue which solidified. This was washed with absolute ether three times by decantation. After removing traces of solvent from the washed product with an aspirator, there was obtained as residue 296.8 g. of the substantially pure tetraethylammonium p-toluenesulfonate, M.P. 103–104° C.

A concentrated aqueous solution (4° Baumé) was prepared by dissolving the 296.8 g. of tetraethylammonium p-toluenesulfonate in 230.5 g. of water. This was employed in the electrolytic hydrodimerization of acrylonitrile, as follows:

Acrylonitrile (94.5 g.) containing a trace of p-nitrosodimethylaniline as stabilizer was added to 141 g. of said solution of the sulfonate to give a catholyte containing 40% by weight of acrylonitrile, based on the total weight of the catholyte. A platinum anode was placed in an Alundum cup containing as anolyte, 30 ml. of said concentrated aqueous solution of the tetraethylammonium p-toluenesulfonate and immersed into a jacketed glass vessel containing the catholyte and 110 ml. of mercury as cathode. An electric current was then passed through the resulting cell for three hours at about 2.3 amperes for the first hour, about 3.2 amperes for the second hour, about 3.4 amperes for the third hour, and an E.M.F. of 19.0 to 17.3 volts for the first hour and from 17.30 to 17.0 for the next two hours. At the end of the three-hour period an electric current of 3.5 amperes was passed into the cell for an additional 30 minutes. The electrolysis was thus conducted at from 5.5 to 6.2 amps./dm.² and a total of 10.1 amp.-hrs. The temperature of the catholyte was maintained at 20.5° C. to 26° C. by employing a mixture of acetone and Dry Ice in the cooling jacket. During the electrolysis, a total of 3.0 ml. of glacial acetic acid was added to the catholyte to maintain the pH thereof just alkaline to phenol red.

After the electrolysis, the catholyte was extracted 6 times with 50 ml. portions of methylene chloride and the solvents stripped off to give 139.1 g. of concentrate. A 10% aliquot of the concentrate was removed for vapor phase chromatography, and the remainder of the concentrate was stripped by aspirator on the water-bath to recover unreacted acrylonitrile and to obtain as residue 23.7 g. of the substantially pure adiponitrile. By vapor phase chromatography it was ascertained that 29.8 g. of the initially employed acrylonitrile had been consumed to give 22.8 g. of adiponitrile; i.e., the adiponitrile was obtained in a 75.2% theoretical yield. Neither propionitrile nor bis(2-cyanoethyl) ether had been formed.

*Example 2*

In order to determine the effect of acrylonitrile concentration on hydrodimerization, the procedure of Example 1 was substantially repeated, except that instead of using a catholyte containing a 40% concentration of acrylonitrile, as in Example 1, there were employed catholytes of lower acrylonitrile concentration.

There was first prepared a 73.3% aqueous solution by adding 586.7 g. of tetraethylammonium p-toluenesulfonate to 215 g. of water. To 156 g. of this solution there was then added 48 g. of water and 53.0 g. (1 mole) of acrylonitrile to give a catholyte having a 20% by weight concentration of acrylonitrile based on the total weight of catholyte. As anolyte there was employed 20 ml. of the 73.3% sulfonate solution plus 20 ml. of water. The apparatus and electrodes were as in Example 1. Electric current was passed through the cell for 3 hours, at an E.M.F. of 19.6 to 17.5 and a total of 11.1 amp.-hrs., while maintaining the temperature at 23.5–25.5° C. and intermittently adding a total of 3.4 ml. of glacial acetic acid to the catholyte in order to maintain the pH thereof just alkaline to phenol red.

After electrolysis, the catholyte was extracted with methylene dichloride, washed with water, dried over potassium carbonate and concentrated to give a 90% yield of adiponitrile, and a 1% yield of propionitrile, based on unrecovered acrylonitrile. Apparently, when using the concentrated aqueous tetraethylammonium p-toluenesulfonate lowering the concentration of acrylonitrile in the catholyte from 40% to 20% results in the formation of propionitrile, but only in a very low amount.

When the experiment of this example was substantially repeated, but using only a 5% concentration of acrylonitrile in the initial catholyte, there was obtained instead of the 99:1 adiponitrile to propionitrile ratio, only a 1.68:1 ratio of adiponitrile to propionitrile, i.e., more than a third of the product was propionitrile. However, when the concentration of acrylonitrile was increased to 10%, and the electrolysis was repeated, the ratio of adiponitrile to propionitrile was very significantly increased, there being obtained about 8 times as much adiponitrile as propionitrile.

*Example 3*

An electrolytic hydrodimerization was effected employing as catholyte an aqueous solution containing 91 g. of ethyl acrylate, 90 g. of a 75% by weight aqueous tetraethylammonium p-toluenesulfonate solution and 68 g. of dimethylformamide.

*Example 4*

As catholyte solution in a hydrodimerization there was employed a solution of 93 g. methacrylonitrile, 93 g. of 75% aqueous tetraethylammonium p-toluenesulfonate, and 37.2 g. of dimethylformamide.

*Example 5*

The catholyte solution employed in an electrolytic hydrodimerization contained 105 g. of dimethylacrylonitrile, 105 g. of a 75% aqueous solution of tetraethylammonium p-toluenesulfonate and 26.7 g. of dimethylformamide.

*Example 6*

The catholyte solution employed in an electrolytic hydrodimerization contained 92 g. of an 89% aqueous solution of methyl tri-n-butylammonium p-toluenesulfonate, 100 g. of acrylonitrile and 43 g. of water, the concentration of acrylonitrile in the catholyte being 42.5% by weight.

*Example 7*

The catholyte solution employed in an electrolytic hydrodimerization contained 104 g. of a 75% aqueous solution of tetraethylammonium p-toluenesulfonate, 104 g. of N,N-diethylacrylamide and 52 g. water.

*Example 8*

The catholyte solution employed in an electrolytic hydrodimerization contained 85 g. acrylamide in a solution of 85 g. of 80% aqueous tetraethylammonium p-toluenesulfonate and 42.5 g. water.

*Example 9*

The catholyte solution employed in an electrolytic hydrodimerization contained 57.7 g. of the diethylamide of cinnamic acid, 101.2 g. of an 80% by weight concentration of tetraethylammonium p-toluenesulfonate in water and 86.6 g. dimethylformamide.

*Example 10*

A 50% acrylonitrile solution was prepared from an aqueous solution containing 62.6% of the benzyltrimethylammonium p-toluenesulfonate.

*Example 11*

Diethyl ethylidenemalonate was hydrodimerized utilizing a catholyte containing 95 g. of the ester in 95 g. of an 80% solution of tetraethylammonium p-toluenesulfonate in water together with 62 g. of dimethylformamide. The product was tetraethyl 2,3-dimethylbutane 1,1,4,4-tetracarboxylate.

*Example 12*

N,N-diethylcrotonamide was dissolved in a 75% by weight solution of tetraethylammonium p-toluenesulfonate in water to form a homogeneous solution containing about 50% by weight of the amide. The solution remained homogeneous upon dilution with water.

*Example 13*

Methyl tri-n-butylammonium p-toluenesulfonate was dissolved in water to form a 56% by weight solution and acrylonitrile was then dissolved therein to form a 42.7% by weight solution.

*Example 14*

Methyl tri-n-butyl p-toluenesulfonate was dissolved in water to form an 89% by weight solution and in 10 g. of the solution 5.33 g. acrylonitrile and 5 g. ethyl acrylate were dissolved forming an aqueous solution containing 26.4% by weight acrylonitrile and 24.5% by weight ethyl acrylate. The solution remained homogeneous upon dilution with 4 g. water.

*Example 15*

A clear solution containing slightly less than 50% by weight of ethyl cinnamate was formed in an aqueous solution of methyl tri-n-butyl p-toluenesulfonate (78.5% in water).

*Example 16*

A 1.02 g. amount of N-methyl maleimid, 1.5 g. of an 86.5% aqueous solution of tetraethylammonium benzenesulfonate and 2.5 g. dimethylformamide were mixed to form a solution which contained 20% of the maleimid.

*Example 17*

A solution containing 30.3% of beta-nitrostyrene was formed from 2 g. of the compound, 2.14 g. of a 76.5% aqueous solution of methyltriethylammonium p-toluenesulfonate, and 2.5 g. of dimethylformamide.

*Example 18*

A solution containing 22.7% acrylonitrile and 21.5% ethyl acrylate was formed from 5.29 g. acrylonitrile, 5 g. ethyl acrylate, 10 g. of a 76.5% aqueous solution of methyltriethylammonium p-toluenesulfonate and 2.62 g. dimethylformamide.

*Example 19*

A solution containing 43.7% beta-ethylacrylonitrile was formed from 1 g. of beta-ethylacrylonitrile, 1 g. of 80% aqueous tetraethylammonium p-toluenesulfonate and 0.29 g. acetonitrile.

*Example 20*

A solution containing 67.7% by weight of N,N'-hexamethyl-ethylenediammonium p-toluenesulfonate in water was employed to dissolve acrylonitrile to provide a solution containing 19.7% by weight acrylonitrile.

The concentrations in aqueous solution which can be obtained will of course vary with the particular organic material as well as with the quaternary ammonium sulfonate salt, and the value and suitability of the various concentrations will further vary with the intended use. The selection of the desirable salt solubilizing agent will also depend to some extent upon the intended use; for example, if the solutions are to be used in electrolytic hydrodimerization procedures, the quaternary ammonium cation of the salt should have a more negative discharge potential than that at which the contemplated hydrodimerization occurs and ammonium cations having an aryl group directly substituted on the nitrogen should be avoided.

The solutions of the present invention generally have at least 10% by weight of their composition composed of the organic material being dissolved, and for many contemplated uses have 30% or more of their weight composed of the organic compound and often the organic compound constitutes 50% or more by weight of the solution; often the solutions are at or approaching saturation with such organic material. It will be realized of course that the reference to organic materials or organic compounds herein is with respect to only the organic materials or compounds being dissolved, and not to the quaternary ammonium salts being used as solubilizing agents. In addition to the value of particular concentrations of organic materials in aqueous systems for particular uses, it will be recognized that there is great potential value in the use of the quaternary ammonium arylsulfonates to make certain organic materials miscible with water over wider ranges of proportions.

The amount of quaternary ammonium arylsulfonate in solution can vary depending upon the amount required to obtain the desired solubility of the organic compound, saturated solutions of the latter frequently being employed. However, generally at least 30% by weight of the salt and water will be the quaternary ammonium arylsulfonate salt, and it is usually preferable to have at least 50% by weight of such salt, the desirability of such concentrations being exemplified in the electrolytic hydrodimerization of acrylonitrile to adiponitrile, in which the acrylonitrile generally constitutes from 15% to 30% or more by weight of the catholyte solution. In some cases it is expedient to increase the solubility of olefinic compound in the electrolysis solution by using a mixture of water and a polar solvent, e.g., acetonitrile, dioxane, ethylene glycol, dimethylformamide, dimethylacetamide, ethanol or isopropanol, together with the quaternary ammonium arylsulfonate salt.

The tetraalkylammonium arylsulfonates are especially convenient for use in the present invention, particularly those in which the alkyl groups have 1 to 4 carbon atoms and which are hydrocarbon except for the ammonium nitrogen and the sulfonate group, and the aryl groups in such sulfonates will generally have no more than 8 carbon atoms, for example, tetraethylammonium p-toluenesulfonate or p-ethylbenzenesulfonate and tetramethylammonium benzenesulfonate. Solutions of acrylonitrile in solutions of these salts and other salts taught herein are of especial interest.

The quaternary ammonium arylsulfonate salts employed herein exhibit advantages, particularly in electrolytic procedures, over the corresponding alkali metal salts. For example, many of the quaternary ammonium salts employed herein have relatively high negative discharge potentials, e.g., more negative than −2.2 cathodic volts as determined in a stirred run versus the saturated calomel electrode. This makes such salts suitable for employment in electrolysis of compounds having fairly negative discharge potentials. Thus the solutions of the present invention are of particular interest when an olefinic compound in such solution is hydrodimerized or otherwise electrolyzed at reduction potentials more negative than −1.6 cathodic volts but less negative than the potential at which the particular quaternary ammonium cation is discharged, for example, less negative than −2.2 cathodic volts. The conversion of acrylonitrile to adiponitrile occurs at about −1.91 cathodic volts whereas the tetraethylammonium ion is not discharged until about −2.5 cathodic volts.

The solutions of the present invention, particularly those in which the organic portion is not completely miscible with the aqueous salt portion, are suitable for use in the electrolysis and extraction procedures taught in my copending application Serial Number 189,072, filed April 20, 1962.

The solutions prepared according to the present invention are useful for the various purposes discussed hereinabove with reference to the objects and purpose of the invention, and for various other purposes for which hydrotropic systems have heretofore been employed.

What is claimed is:

1. A solution consisting essentially of water, a hygroscopic tetraalkylammonium arylsulfonate in which each alkyl group contains up to six carbon atoms dissolved in an amount at least 30% by weight of the water and arylsulfonate and more than 10% by weight of the solution of an olefin which dissolved therein but is soluble in an amount less than 10% by weight in pure water, said olefin containing no more than twenty carbon atoms and being selected from the group consisting of olefinic hydrocarbons, alpha,beta mono-olefinic hydrocarbon nitriles, hydrocarbyl esters of alpha,beta mono-olefinic hydrocarbon carboxylic acids and amides of alpha,beta mono-olefinic hydrocarbon carboxylic acids.

2. The solution of claim 1 in which the arylsulfonate is toluenesulfonate.

3. The solution of claim 1 in which the arylsulfonate is benzenesulfonate.

4. The solution of claim 1 in which the olefin is an alpha,beta-mono-olefinic nitrile.

5. The solution of claim 1 in which the olefin is acrylonitrile.

6. The solution of claim 1 in which the olefin is an alpha,beta-mono-olefinic carboxylic acid ester.

7. The solution of claim 1 in which the olefin is an amide of an alpha,beta-mono-olefinic carboxylic acid.

8. The solution of claim 1 in which the olefin is acrylamide.

9. A solution consisting essentially of water, tetraalkylammonium arylsulfonate constituting at least 50% by weight of the water and arylsulfonate, and from 15 to 30% by weight of acrylonitrile dissolved in said solution, the alkyl groups having from 1 to 4 carbon atoms and the aryl group containing up to 8 carbon atoms.

10. A solution consisting essentially of water, a hygroscopic tetraalkylammonium aryl sulfonate in which each alkyl group contains up to six carbon atoms dissolved in an amount at least 30% by weight of the water and aryl sulfonate and more than 10% by weight of the solution of an aromatic hydrocarbon which is soluble in said solution but soluble in an amount less than 10% by weight in pure water.

11. The solution of claim 1 in which the olefin constitutes more than 50% by weight of the solution.

12. The method of forming concentrated aqueous solutions which comprises mixing together water and a hygroscopic tetraalkylammonium aryl sulfonate in which each alkyl group contains up to six carbon atoms in an amount at least 30% by weight of the water and aryl sulfonate and an olefin in an amount to constitute more than 10% by weight of the solution, the olefin being soluble in an amount less than 10% by weight in pure water and containing no more than twenty carbon atoms and being selected from the group consisting of olefinic hydrocarbons, alpha,beta mono-olefinic hydrocarbon nitriles, hydrocarbyl esters of alpha,beta mono-olefinic hydrocarbon carboxylic acids and amides of alpha,beta mono-olefinic hydrocarbon carboxylic acids.

13. The solution of claim 1 in which the tetraalkylammonium aryl sulfonate is tetraethylammonium benzenesulfonate.

14. The solution of claim 1 in which the tetraalkylammonium aryl sulfonate is tetraethylammonium toluenesulfonate.

15. The solution of claim 1 in which the tetraalkylammonium aryl sulfonate is tetramethylammonium toluenesulfonate.

16. The solution of claim 1 in which the tetraalkylammonium aryl sulfonate is tetramethylammonium benbenesulfonate.

References Cited by the Examiner

UNITED STATES PATENTS

| | | | |
|---|---|---|---|
| 2,541,248 | 2/51 | Hibbs | 260—567.6 |
| 2,759,975 | 8/56 | Chiddix et al. | 252—357 |

FOREIGN PATENTS 586,647   11/59   Canada.

MORRIS LIEBMAN, *Primary Examiner.*

Disclaimer 3,198,746.—*Manuel M. Baizer*, St. Louis, Mo. QUATERNARY AMMONIUM ARYLSULFONATE SOLUTIONS. Patent dated Aug. 3, 1965. Disclaimer filed June 28, 1965, by the assignee, *Monsanto Company*.

Hereby disclaims the terminal portion of said patent subsequent to July 5, 1982.

[*Official Gazette September 28, 1965.*]